United States Patent Office 3,337,723
Patented Aug. 22, 1967

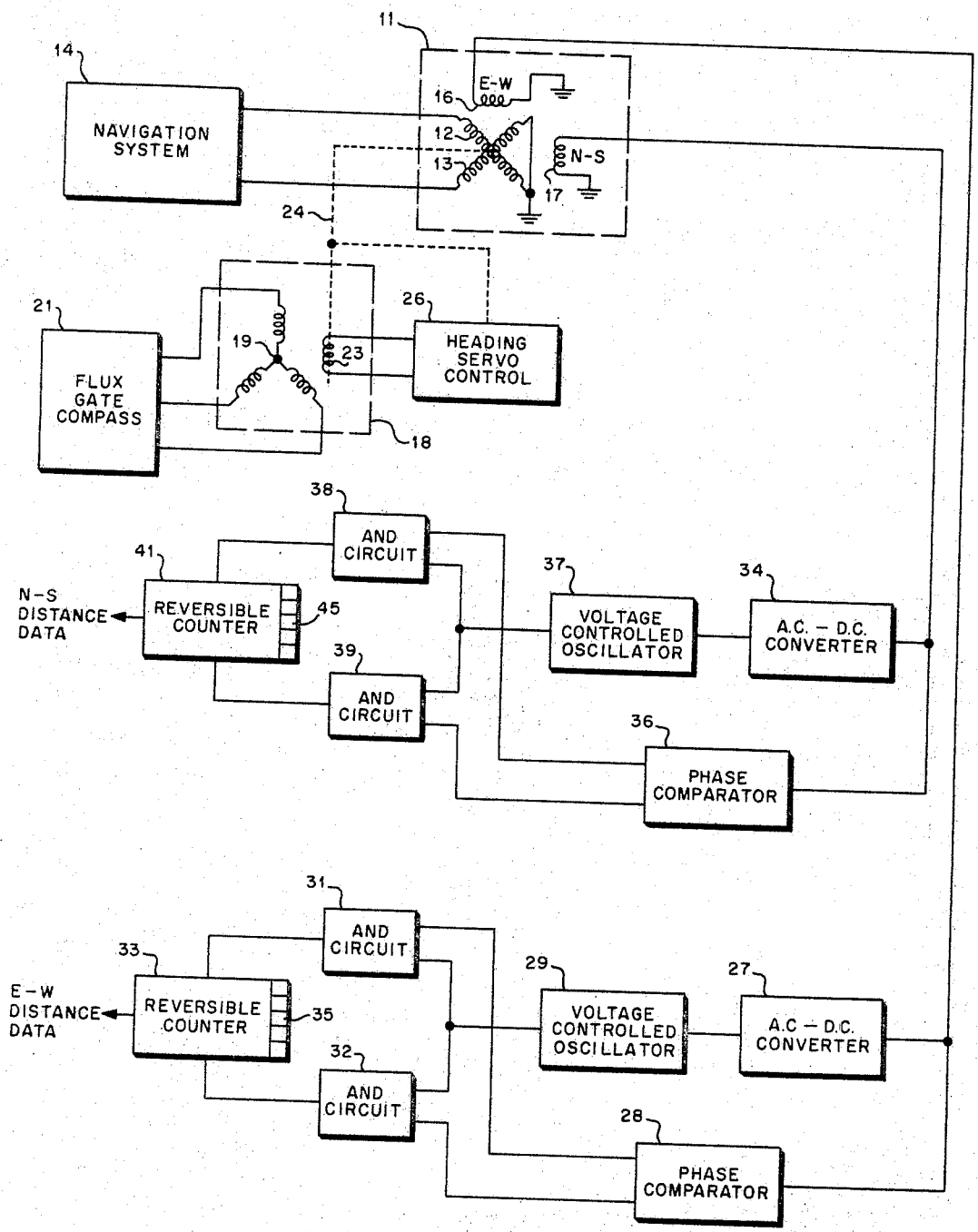

3,337,723
INTEGRATING DATA CONVERTER TO PROVIDE CONTINUOUS REPRESENTATION OF AIRCRAFT POSITION
Lee M. Etnyre, Hatboro, Pa., assignor to the United States of America as represented by the Secretary of the Navy
Filed Aug. 29, 1963, Ser. No. 305,560
8 Claims. (Cl. 235—150.27)

The invention described herein may be manufactured and used by or for the Government of the United States of America for governmental purposes without the payment of any royalties thereon or therefor.

This invention relates to data converters and more particularly to a system for converting inputs of aircraft heading and velocity to an instantaneous, continuous representation of aircraft position.

Although there are presently available today navigation systems providing an aircraft pilot with course, range and bearing information from which aircraft positional information with respect to a known reference point may be calculated or automatically computed, these systems are highly complicated, costly and have other disadvantages which deter their use in many situations where aircraft positional information is desirable or necessary.

Most military aircraft are provided with standard sensor apparatus providing output signals representative of ground speed, drift angle, and aircraft heading. Usually these outputs are fed directly to display devices giving the pilot an indication of ground track speed and direction of flight. To obtain x and y coordinate information of the aircraft relative to a reference point the pilot must constantly monitor these display devices and mentally calculate aircraft position with the aid of standard plotting methods and chart maps. In order to obtain continuous information of aircraft position with respect to a reference point the pilot must make the same calculations repeatedly. Aside from distracting the pilot from his more important functions these calculations are obviously prone to error and inaccuracies. This is particularly true where the aircraft reverses direction since the pilot must note this and calculate a present position of his aircraft which might then be decreasing in terms of distance from the reference point. Moreover, since it requires a finite time for the pilot to calculate his position, the calculated position lags behind actual position in time.

The present invention contemplates a system for converting inputs representative of heading, heading velocity, and drift velocity into a highly accurate digital representation of position of the aircraft relative to a reference point on earth. To accomplish this the present invention utilizes a unique combination of electronic components which in effect integrates voltages representative of east-west and north-south components of aircraft velocity and provides a digital output for display, further utilization or both.

The present invention has the primary objective of providing a highly accurate, continuous, and substantially instantaneous indication of aircraft position with respect to a reference earth position and accomplishes this objective by utilizing outputs readily available in most military aircraft.

Therefore, it is an object of the present invention to provide a system for automatically indicating aircraft position with respect to a reference position.

It is another object of the present invention to provide a system utilizing available inputs to provide instantaneous, automatic, and continuous indication of the coordinate position of an aircraft with respect to a reference coordinate position.

Still another object of the present invention is to provide a data converter for converting analog aircraft heading and velocity inputs into a highly accurate digitalized output proportional to the position of the aircraft with respect to a reference position.

Yet another object of the present invention is to provide a system for automatically indicating distance in the east-west direction and distance in the north-south direction from a reference position as a continuous display of aircraft present position to the pilot.

The exact nature of this invention, as well as other objects and advantages thereof, will be readily apparent from consideration of the following specification relating to the annexed drawing in which:

The figure illustrates a preferred embodiment of the present invention.

Referring now more particularly to the figure there is shown a resolver 11. This resolver comprises rotor coils 12 and 13 each having an end commonly connected to ground. The other end of coil 12 is connected to a navigation system 14 such as the APN–122 which provides an A.C. voltage having an amplitude proportional to the heading velocity of the aircraft to rotor coil 12. The other end of coil 13 is also connected to navigation system 14 which provides coil 13 with an A.C. voltage input having an amplitude proportional to drift velocity of the aircraft.

The resolver further comprises stator coils 16 and 17 which provide A.C. voltage outputs having amplitudes proportional to the east-west and north-south components of velocity, respectively. The magnitudes of the components of east-west and north-south velocity of the aircraft depend on the heading of the aircraft. For example, if the aircraft is flying directly north or south no velocity component is induced in coil 16 since there is no velocity component in the east-west direction. Similarly, if the aircraft is flying due east or west no component of velocity signal is induced in coil 17. For any other heading each of coils 16 and 17 have induced therein a voltage of constant frequency but of magnitudes proportional to actual east-west, north-south velocities.

Rotor coils 12 and 13 are fixed relative to each other but rotate relative to stator coils 16 and 17 in accordance with changes in heading of the aircraft. Thus, the amplitude of the A.C. voltage induced in stator coils 16 and 17 varies in accordance with the relative position of rotor coils 12 and 13 and, therefore, aircraft heading.

One method of rotating rotor coils 12 and 13 in accordance with aircraft heading changes is illustrated in the figure. A control transformer 18 comprises stator coils 19 in a Y connection. The Y connection is utilized to accommodate a typical output of a conventional flux gate compass 21. Voltage in coils 19 which is proportional to the heading of the aircraft induces a voltage in rotor coil 23 which reacts with the magnetic field of coils 19. In a manner well known in the art coil 23 is displaced an amount proportional to heading change. Mechanical connection of shaft 24 connects coil 23 to rotor coils 12 and 13 thereby orienting them in accordance with aircraft heading. Heading servo control 26 generates in a well-known manner a nulling voltage causing coil 23 and the shaft 24 to be positioned so that the nulling voltage nulls out the voltage induced in coil 23. Heading servo control 26 may be any miniaturized servo control system which comprises generally a motor-generator and feed back arrangement.

Coil 16 which carries the east-west voltage component of velocity is connected to A.C.-D.C. converter 27 and to phase comparator 28. The A.C.-D.C. converter 27 changes the A.C. voltage having an amplitude proportional to velocity of the aircraft in the east-west direction induced in coil 16 to a D.C. voltage having a magnitude proportional to east-west velocity of the aircraft. The A.C.-D.C. converter 27 is connected to voltage controlled oscillator 29 which is thereby caused to generate an output voltage having a frequency proportional to aircraft velocity in the east-west direction. The output of frequency voltage controlled oscillator 29 varies linearly from zero to a predetermined higher frequency in accordance with the magnitude of the signal applied to it from A.C.-D.C. converter 27. Detailed circuitry of A.C.-D.C. converter 27 and voltage controlled oscillator 29 forms no part of this invention and each of A.C.-D.C. converter 27 and voltage controlled oscillator 29 may be of a conventional design readily available in the prior art.

The output terminal of voltage controlled oscillator 29 is connected to "and" circuits 31 and 32. Phase comparator 28 has one output terminal connected to "and" circuit 31 and another output terminal connected to "and" circuit 32.

The phase of the A.C. voltage induced in stator coil 16 changes by 180° whenever the aircraft reverses direction. For example, if the aircraft is traveling due east or in any direction having an easterly component in it, the phase in stator coil 16 will be different by 180° than if the aircraft were traveling due west or in any direction having a westerly component in it. The point at which the phase of the voltage in stator coil 16 is reversed is, of course, the point when the direction of heading of the aircraft intersects a line parallel to the north-south direction. Phase comparator 28 which is connected to stator coil 16 detects this phase reversal and applies an input to either "and" gate 31 or "and" gate 32. Thus, when the aircraft heading has any component of east an input is applied to "and" gate 31 and when the aircraft heading has any component of west an input is applied to "and" gate 32. The output from voltage controlled oscillator 29 is fed through "and" gate 31 or "and" gate 32 to reversible counter 33 depending on which of "and" gates 31 or 32 has applied thereto an output from phase comparator 28. If it is "and" gate 31 that has an input from phase comparator 28, the frequency from voltage controlled oscillatotr 29 is fed to the count up channel of reversible counter 33 which counts the cycles of frequency from voltage controlled oscillator 29. Similarly, if it is "and" gate 32 that has received an input from phase comparator 28, the output from voltage controlled oscillator 29 is fed to the count down channel of reversible counter 33 which causes reversible counter 33 to count in an opposite direction when it is receiving its input through "and" gate 31. Since the number of cycles of the output frequency of controlled oscillator 29 is counted in reversible counter 33, the velocity output from navigation system 14 is integrated and the result is that the total number of cycles that have been counted is proportional to the distance traveled from some initial point in the east-west direction. Due to the fact that the east-west velocity component may sometimes be positive and sometimes negative, the sign of the velocity is taken into account in the integration by means of use of a dual channel reversible counter in combination with the phase comparator 28 and the "and" circuits 31 and 32.

Reversible counter 33 may be provided with visual count register 35 which indicates distance in the east-west direction from the point of reference.

The north-south channel of the present system is identical to the east-west channel just described and comprises A.C.-D.C. converter 34, phase comparator 36, voltage controlled oscillator 37, "and" circuits 38 and 39, and reversible counter 41 with count register 45. This combination of elements is identical to that used in the east-west channel and functions in the same manner. Reversible counter 41, however, provides a digital output visually indicated on register 45 of distance in the north-south direction from the reference point. Thus, reversible counters 33 and 41 taken together give the north-south, east-west coordinate position of the aircraft with respect to the reference point. The reference point is the point at which the system is activated which may be the take-off point or any other point chosen in flight.

Aside from visually indicating to a pilot his position relative to a reference point, the output of reversible counters 33 and 41 may provide an input proportional to aircraft position to any digital type utilization circuit, for example, a navigation computer or automatic plotting device.

The outputs from reversible counters 33 and 41 are in digital format and are, therefore, readily available for digital computer computation as well as conversion to visual outputs. The counters may, of course, eventually become saturated, that is, reach the count past which they are not capable of counting. At that time the counters, of course, may be reset and the accumulated data stored for future reference. However, depending on the particular counters selected for use in this invention, counts representative of miles to the nearest hundredth may be registered and indicated on the display. It is pointed out that the present system requires no analog, synchro, or mechanical gear train links to perform the integration process which is completely digital.

Obviously many modifications and variations of the present invention are possible in the light of the above teachings. It is, therefore, to be understood that within the light of the appended claims the invention may be practiced otherwise than as specifically described.

What is claimed is:

1. A data converter for converting aircraft velocity and heading inputs into a digital output proportonal to aircraft position relative to a reference point, comprising in combination:
    means providing an A.C. voltage output having an amplitude proportional to aircraft velocity and a phase representative of direction of travel,
    A.-C.-D.C. converter means connected to said means providing a D.C. voltage output having a magnitude proportional to aircraft velocity,
    voltage controlled oscillator means connected to said A.C.-D.C. converter means providing a frequency output having a repetition rate proportional to said magnitude of said D.C. voltage,
    reversible counter means connected to said voltage controlled oscillator means counting the number of cycles of said frequency output,
    phase comparator means connected between said means and said reversible counter means causing said reversible counter means to count up when any component of aircraft velocity is in one direction and to count down when any component of aircraft velocity is in the opposite direction whereby the count in said reversible counter means is indicative of aircraft position.

2. A data converter for converting aircraft velocity and heading inputs into a digital output proportional to aircraft position relative to a reference point, comprising in combination:
    velocity signal means providing an A.C. voltage output having an amplitude proportional to aircraft velocity and a phase representative of direction of travel,
    A.C.-D.C. converter means connected to said velocity signal means providing a D.C. voltage output having a magnitude proportional to aircraft velocity,
    voltage controlled oscillator means connected to said A.C.-D.C. converter means providing a frequency output having a repetition rate proportional to said magnitude of said D.C. voltage,
    first "and" circuit means,
    second "and" circuit means,
    conductor means connecting said voltage controlled oscillator means to said first and second "and" circuit means,
    phase comparator means connected to said velocity signal means and to said first and second "and" circuit means providing said first "and" circuit means with an input voltage when said aircraft has any component of velocity in one direction or an input to said second "and" circuit means when the aircraft has any component of velocity in the reverse direction, reversible counter means having a first channel connected to said first "and" circuit means and a second channel connected to said second "and" circuit means counting in one direction when said first "and" circuit means has an input from said phase comparator means and in the opposite direction when said second "and" circuit means has an input from said phase comparator means whereby said reversible counter means continuously registers a count indicative of aircraft position.

3. A data converter for converting aircraft velocity and heading inputs into a digital output proportional to aircraft position relative to a reference point, comprising in combination:
first means providing an A.C. voltage output having an amplitude proportional to aircraft velocity in the east-west direction,
second means providing an A.C. voltage output having an amplitude proportional to aircraft velocity in the north-south direction,
first converter means connected to said first means converting said A.C. voltage output to a D.C. voltage having an amplitude proportional to said aircraft velocity in the east-west direction,
second converter means connected to said second means converting said A.C. voltage output to a D.C. voltage having an amplitude proportional to said aircraft velocity in the north-south direction,
first voltage controlled oscillator means connected to said first converter means providing an output frequency having a repetition rate proportional to said D.C. voltage from said first converter means,
second voltage controlled oscillator means connected to said second converter means providing an output frequency having a repetition rate proportional to said D.C. voltage from said second converter means,
individual counter means connected to each of said first and second voltage controlled oscillator means accumulatively counting the cycles of the respective frequency outputs of said first and second voltage controlled oscillator means whereby said counter means registers a first count indicative of aircraft position in the east-west direction relative to the reference point and a second count indicative of aircraft position in a north-south direction relative to the reference point.

4. A data converter according to claim 3 wherein said first and second means comprise:
resolver means,
input means connected to said resolver means providing said resolver means with a voltage input proportional to aircraft velocity,
flux gate compass means connected to said resolver means providing said resolver means with an input proportional to aircraft heading whereby said resolver means provides a first output voltage proportional to aircraft velocity in the east or west direction and a second output voltage proportional to aircraft velocity in the north or south direction.

5. A data converter for converting aircraft velocity and heading inputs into a digital output proportional to aircraft position relative to a reference point, comprising in combination:
first velocity signal means providing an A.C. voltage output having an amplitude proportional to aircraft velocity in the east-west direction and a phase representative of direction of travel,
second velocity signal means providing an A.C. voltage output having an amplitude proportional to aircraft velocity in the north-south direction and a phase representative of direction of travel,
first A.C.-D.C. converter means connected to said first velocity signal means providing a D.C. voltage output having a magnitude proportional to aircraft velocity in the east-west direction,
second A.C.-D.C. converter means connected to said second velocity signal means providing a D.C. voltage output having a magnitude proportional to aircraft velocity in the north-south direction,
first voltage controlled oscillator means connected to said first A.C.-D.C. converter means providing a frequency output having a repetition rate proportional to said magnitude of said D.C. voltage from said first A.C.-D.C. converter means,
second voltage controlled oscillator means connected to said second A.C.-D.C. converter means providing a frequency output having a repetition rate proportional to said magnitude of said D.C. voltage from said second A.C.-D.C. converter means,
first reversible counter means connected to said first voltage controlled oscillator means counting the number of cycles of said frequency output from said first voltage controlled oscillator means,
second reversible counter means connected to said second voltage controlled oscillator means counting the number of cycles of said frequency output from said second voltage controlled oscillator means,
first phase comparator means connected between said first velocity signal means and said first reversible counter means causing said first reversible counter means to count up when any component of aircraft velocity is in the easterly direction and to count down when any component of aircraft velocity is in the westerly direction,
second phase comparator means connected between said second velocity signal means and said second reversible counter means causing said second reversible counter means to count up when any component of aircraft velocity is in the northerly direction and to count down when any component of aircraft velocity is in the southerly direction,
whereby the count in said first and second reversible counter means is indicative of aircraft position.

6. A data converter according to claim 5 wherein said first and second velocity signal means comprise:
resolver means,
input means connected to said resolver means providing said resolver means with a voltage input proportional to aircraft velocity,
flux gate compass means connected to said resolver means providing said resolver means with an input proportional to aircraft heading whereby said resolver means provides a first output voltage proportional to aircraft velocity in the east or west direction and a second output voltage proportional to aircraft velocity in the north or south direction.

7. A data converter for converting aircraft velocity and heading inputs into a digital output proportional to aircraft position relative to a reference point, comprising in combination:
first velocity signal means providing an A.C. voltage output having an amplitude proportional to aircraft velocity in the east-west direction and a phase representative of direction of travel,
second velocity signal means providing an A.C. voltage output having an amplitude proportional to aircraft velocity in the north-south direction and a phase representative of direction of travel,
first A.C.-D.C. converter means connected to said first velocity signal means providing a D.C. voltage output having a magnitude proportional to aircraft velocity in the east-west direction,
second A.C.-D.C. converter means connected to said second velocity signal means providing a D.C. voltage output having a magnitude proportional to aircraft velocity in the north-south direction, first voltage controlled oscillator means connected to said first A.C.-D.C. converter means providing a frequency output having a repetition rate proportional to said magnitude of said D.C. voltage from said first A.C.-D.C. converter means, second voltage controlled oscillator means connected to said second A.C.-D.C. converter means providing a frequency output having a repetition rate proportional to said magnitude of said D.C. voltage from said second A.C.-D.C. converter means, first "and" circuit means, second "and" circuit means, first conductor means connecting said first voltage controlled oscillator means to said first and second "and" circuit means, first phase comparator means connected to said first velocity signal means and to said first and second "and" circuit means providing said first "and" circuit means with an input voltage when any component of aircraft velocity is in the easterly direction or any input to said second "and" circuit means when any component of aircraft velocity is in the westerly direction, third "and" circuit means, fourth "and" circuit means, second conductor means connecting said second voltage controlled oscillator means to said third and fourth "and" circuit means, second phase comparator means connected to said second velocity signal means and to said third and fourth "and" circuit means providing said third "and" circuit means with an input voltage when any component of aircraft velocity is in the northerly direction or an input to said fourth "and" circuit means when any component of aircraft velocity is in the southerly direction, first reversible counter means having a first channel connected to said first "and" circuit means and a second channel connected to said second "and" circuit means counting in one direction when said first "and" circuit means has an input from said first phase comparator means and in the opposite direction when said second "and" circuit means has an input from said first phase comparator means, second reversible counter means having a first channel connected to said third "and" circuit means and a second channel connected to said fourth "and" circuit means counting in one direction when said third "and" circuit means has an input from said second phase comparator means and in the opposite direction when said fourth "and" circuit means has an input from said second phase comparator means, whereby said first and second reversible counter means continuously register counts indicative of aircraft position in the east-west and north-south directions, respectively.

8. A data converter according to claim 7 wherein said first and second velocity signal means comprise:

resolver means, input means connected to said resolver means providing said resolver means with a voltage input proportional to aircraft velocity, flux gate compass means connected to said resolver means providing said resolver means with an input proportional to aircraft heading whereby said resolver means provides a first output voltage proportional to aircraft velocity in the east or west direction and a second output voltage proportional to aircraft velocity in the north or south direction.

References Cited
UNITED STATES PATENTS

| | | | |
|---|---|---|---|
| 3,028,078 | 4/1962 | George et al. | 235—150.27 |
| 3,230,358 | 1/1966 | Davis et al. | 235—150.51 X |
| 3,284,616 | 11/1966 | Ernyei et al. | 235—151.35 X |

MALCOLM A. MORRISON, *Primary Examiner.*

K. W. DOBYNS, M. P. HARTMAN,
*Assistant Examiners.*